United States Patent
Morrow et al.

(10) Patent No.: US 11,597,255 B2
(45) Date of Patent: Mar. 7, 2023

(54) SYSTEMS AND METHODS FOR COOLING VEHICLE COMPONENTS

(71) Applicant: Pony AI Inc., Grand Cayman (KY)

(72) Inventors: Luke Morrow, Gilroy, CA (US); Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 15/931,524

(22) Filed: May 13, 2020

(65) Prior Publication Data

US 2021/0300150 A1  Sep. 30, 2021

Related U.S. Application Data

(60) Provisional application No. 62/994,689, filed on Mar. 25, 2020.

(51) Int. Cl.
*B60H 1/00* (2006.01)
*B60H 1/14* (2006.01)
*H01M 10/613* (2014.01)
*H01M 10/63* (2014.01)
*H01M 10/6568* (2014.01)
*H01M 10/625* (2014.01)
*H01M 10/663* (2014.01)
*H01M 10/667* (2014.01)
*B60K 11/02* (2006.01)
*B60K 1/00* (2006.01)

(52) U.S. Cl.
CPC ..... *B60H 1/00885* (2013.01); *B60H 1/00271* (2013.01); *B60H 1/00807* (2013.01); *B60H 1/00899* (2013.01); *B60H 1/143* (2013.01); *B60K 11/02* (2013.01); *H01M 10/613* (2015.04); *H01M 10/625* (2015.04); *H01M 10/63* (2015.04); *H01M 10/6568* (2015.04); *H01M 10/663* (2015.04); *H01M 10/667* (2015.04); *B60H 2001/00307* (2013.01); *B60K 1/00* (2013.01); *B60K 2001/003* (2013.01); *B60K 2001/005* (2013.01); *B60K 2001/006* (2013.01); *B60K 2001/008* (2013.01); *B60Y 2400/302* (2013.01); *H01M 2220/20* (2013.01); *Y02E 60/10* (2013.01)

(58) Field of Classification Search
CPC ............ B60H 1/00885; B60H 1/00807; B60H 1/143; B60H 2001/00307; B60K 11/02; B60Y 2400/302
See application file for complete search history.

(56) References Cited

U.S. PATENT DOCUMENTS 3,029,614 A * 4/1962 Klatt ................ F25B 13/00
                                            62/196.4
3,150,501 A * 9/1964 Moore .............. F25B 13/00
                                            62/174

(Continued)

OTHER PUBLICATIONS

International Search Report and Written Opinion for PCT/US2021/023903 dated Jul. 23, 2021, 8 pages.

*Primary Examiner* — Ljiljana V. Ciric

(57) ABSTRACT

A system includes heat generating components in a vehicle and a coolant flow path connected to the heat generating components. The system includes a coolant pump that circulates coolant through the coolant flow path and a reversing mechanism that reverses a direction of circulation of coolant.

7 Claims, 11 Drawing Sheets

(56) References Cited

U.S. PATENT DOCUMENTS

| | | | | |
|---|---|---|---|---|
| 3,209,551 A * | 10/1965 | Jentet | ............... | F25B 40/00 |
| | | | | 62/243 |
| 3,455,743 A * | 7/1969 | Huebscher | ........ | H01M 8/04029 |
| | | | | 165/110 |
| 3,553,023 A * | 1/1971 | Doyle | ............... | H01M 8/08 |
| | | | | 429/410 |
| 3,627,030 A * | 12/1971 | Lorenz | ............... | F24F 5/0003 |
| | | | | 165/221 |
| 3,844,130 A * | 10/1974 | Wahnish | ............... | B60K 25/02 |
| | | | | 62/133 |
| 3,978,912 A * | 9/1976 | Penny | ............... | F28D 17/04 |
| | | | | 165/4 |
| 3,995,443 A * | 12/1976 | Iversen | ............... | F24F 3/06 |
| | | | | 62/305 |
| 4,007,315 A * | 2/1977 | Brinkmann | ............ | B60L 50/64 |
| | | | | 429/62 |
| 4,015,182 A * | 3/1977 | Erdman | ............... | F23N 3/082 |
| | | | | 388/934 |
| 4,030,312 A * | 6/1977 | Wallin | ............... | F25B 29/00 |
| | | | | 62/235.1 |
| 4,173,865 A * | 11/1979 | Sawyer | ............... | F25B 13/00 |
| | | | | 62/160 |
| 4,197,719 A * | 4/1980 | Shaw | ............... | F04C 18/16 |
| | | | | 62/505 |
| 4,263,785 A * | 4/1981 | Barniak | ............... | F25B 39/04 |
| | | | | 62/79 |
| 4,293,092 A * | 10/1981 | Hatz | ............... | F25B 30/02 |
| | | | | 122/26 |
| 4,295,344 A * | 10/1981 | Hannett | ............... | F25B 30/02 |
| | | | | 62/324.5 |
| 4,308,042 A * | 12/1981 | Ecker | ............... | F25B 40/04 |
| | | | | 62/282 |
| 4,308,723 A * | 1/1982 | Ecker | ............... | F24D 11/0264 |
| | | | | 62/235.1 |
| 4,332,144 A * | 6/1982 | Shaw | ............... | F04B 49/225 |
| | | | | 62/505 |
| 4,380,156 A * | 4/1983 | Ecker | ............... | F25B 43/006 |
| | | | | 62/238.7 |
| 4,409,796 A * | 10/1983 | Fisher | ............... | F24F 11/30 |
| | | | | 62/238.7 |
| 4,493,193 A * | 1/1985 | Fisher | ............... | F25B 13/00 |
| | | | | 62/238.7 |
| 4,514,990 A * | 5/1985 | Sulkowski | ............ | F25B 49/027 |
| | | | | 62/238.7 |
| 4,582,765 A * | 4/1986 | Kothmann | ............... | F28F 13/06 |
| | | | | 165/97 |
| 4,598,557 A * | 7/1986 | Robinson | ............... | F25B 13/00 |
| | | | | 62/238.7 |
| 4,612,782 A * | 9/1986 | Urch | ............... | F25B 1/06 |
| | | | | 62/500 |
| 4,655,278 A * | 4/1987 | Seguin | ............... | F24F 3/001 |
| | | | | 62/412 |
| 4,667,480 A * | 5/1987 | Bessler | ............... | G05D 23/20 |
| | | | | 361/22 |
| 4,694,798 A * | 9/1987 | Kato | ............... | F02D 41/083 |
| | | | | 123/585 |
| 4,930,455 A * | 6/1990 | Creed | ............... | F01P 7/165 |
| | | | | 123/41.1 |
| 4,962,809 A * | 10/1990 | Belcher | ............... | F28D 7/0058 |
| | | | | 165/DIG. 123 |
| 5,003,788 A * | 4/1991 | Fischer | ............... | F25D 21/12 |
| | | | | 62/238.7 |
| 5,043,232 A * | 8/1991 | Landau | ............... | H01M 8/0612 |
| | | | | 429/434 |
| 5,325,676 A * | 7/1994 | Meckler | ............... | F24F 5/001 |
| | | | | 62/93 |
| 5,490,572 A * | 2/1996 | Tajiri | ............... | B60L 1/003 |
| | | | | 180/68.5 |
| 5,502,365 A * | 3/1996 | Nanbu | ............... | B60L 1/00 |
| | | | | 318/800 |
| 5,562,538 A * | 10/1996 | Suyama | ............... | B60L 53/14 |
| | | | | 454/75 |
| 5,568,732 A * | 10/1996 | Isshiki | ............... | G05D 23/1931 |
| | | | | 62/228.4 |
| 5,586,613 A * | 12/1996 | Ehsani | ............... | B60W 10/06 |
| | | | | 180/65.23 |
| 5,657,638 A * | 8/1997 | Erdman | ............... | F25D 17/062 |
| | | | | 62/158 |
| 5,899,081 A * | 5/1999 | Evans | ............... | B60H 1/00428 |
| | | | | 62/323.3 |
| 6,035,658 A * | 3/2000 | Launois | ............... | F25B 13/00 |
| | | | | 62/196.4 |
| 6,059,027 A * | 5/2000 | Lake | ............... | B60H 1/3207 |
| | | | | 165/204 |
| 6,077,158 A * | 6/2000 | Lake | ............... | B60H 1/00278 |
| | | | | 454/70 |
| 6,099,617 A * | 8/2000 | Bennett | ............... | B64D 13/06 |
| | | | | 95/143 |
| 6,118,099 A * | 9/2000 | Lake | ............... | B60H 1/2218 |
| | | | | 219/202 |
| 6,138,466 A * | 10/2000 | Lake | ............... | B60H 1/00392 |
| | | | | 62/238.7 |
| 6,195,999 B1 * | 3/2001 | Arnold | ............... | H01M 8/04029 |
| | | | | 60/671 |
| 6,347,528 B1 * | 2/2002 | Iritani | ............... | B60H 1/3207 |
| | | | | 62/434 |
| 6,397,600 B1 * | 6/2002 | Romanelli | ............ | F01K 25/08 |
| | | | | 60/671 |
| 6,407,533 B1 * | 6/2002 | Bartek | ............... | H01M 10/6566 |
| | | | | 320/150 |
| 6,889,762 B2 * | 5/2005 | Zeigler | ............... | B60H 1/00778 |
| | | | | 62/133 |
| 7,086,452 B1 | 8/2006 | Senyk et al. | | |
| 7,140,330 B2 * | 11/2006 | Rogers | ............... | F01P 11/20 |
| | | | | 123/41.14 |
| 7,172,831 B2 * | 2/2007 | Jaura | ............... | H01M 10/613 |
| | | | | 429/61 |
| 7,465,508 B2 * | 12/2008 | Alp | ............... | H01M 8/04425 |
| | | | | 429/414 |
| 7,749,632 B2 * | 7/2010 | Zhang | ............... | H01M 8/0267 |
| | | | | 429/438 |
| 8,205,702 B2 | 6/2012 | Hoermandinger | ............... | |
| | | | | H01M 10/6566 |
| | | | | 180/68.5 |
| 8,288,997 B2 * | 10/2012 | Choi | ............... | B60K 6/28 |
| | | | | 320/132 |
| 8,607,855 B2 * | 12/2013 | Feuerecker | ........ | B60H 1/00907 |
| | | | | 62/238.7 |
| 9,162,549 B2 | 10/2015 | Kim | | |
| 9,234,604 B2 | 1/2016 | Kim | | |
| 9,556,782 B2 | 1/2017 | Kim | | |
| 9,650,940 B2 * | 5/2017 | Kakehashi | ............... | B60K 6/22 |
| 10,003,092 B2 * | 6/2018 | Kells | ............... | H01M 8/2484 |
| 10,006,312 B2 * | 6/2018 | Rewers | ............... | F01K 13/02 |
| 10,161,361 B2 * | 12/2018 | Quix | ............... | F02M 26/33 |
| 10,267,546 B2 * | 4/2019 | Evans | ............... | B60H 1/00328 |
| 10,343,483 B2 * | 7/2019 | Kim | ............... | B60H 1/00899 |
| 10,451,295 B2 * | 10/2019 | James | ............... | F24F 11/0001 |
| 10,486,493 B2 * | 11/2019 | Kim | ............... | B60H 1/00278 |
| 10,486,500 B2 * | 11/2019 | Kim | ............... | B60H 1/3229 |
| 10,494,985 B2 * | 12/2019 | Okamura | ............... | F01P 7/167 |
| 10,562,372 B2 * | 2/2020 | Hansson | ............... | F25B 49/02 |
| 10,611,212 B2 * | 4/2020 | Kuroda | ............... | B60H 1/10 |
| 10,625,563 B2 * | 4/2020 | Kim | ............... | B60H 1/00392 |
| 10,675,948 B2 * | 6/2020 | Connell | ............... | B60H 1/323 |
| 10,677,500 B2 * | 6/2020 | Kim | ............... | F25B 13/00 |
| 10,724,772 B2 * | 7/2020 | Connell | ............... | F25B 43/006 |
| 10,907,848 B2 * | 2/2021 | Wallace | ............... | F24F 11/0008 |
| 11,021,041 B2 * | 6/2021 | He | ............... | B60H 1/00507 |
| 11,254,190 B2 * | 2/2022 | He | ............... | F25B 6/04 |
| 11,357,138 B2 * | 6/2022 | Lee | ............... | H01H 13/18 |
| 2001/0010261 A1 * | 8/2001 | Oomura | ............... | B60K 6/48 |
| | | | | 165/42 |
| 2002/0174673 A1 * | 11/2002 | Wilkinson | ............ | F25B 13/00 |
| | | | | 62/260 |
| 2003/0145610 A1 * | 8/2003 | Leuthner | ............... | B60H 1/00907 |
| | | | | 62/196.1 |
| 2004/0026074 A1 * | 2/2004 | Ahner | ............... | F01P 7/164 |
| | | | | 165/254 |

(56) References Cited

U.S. PATENT DOCUMENTS

| | | | |
|---|---|---|---|
| 2004/0209135 A1* | 10/2004 | Wexel | H01M 8/04022 429/441 |
| 2004/0229087 A1* | 11/2004 | Senner | H01M 8/04119 429/454 |
| 2005/0133215 A1* | 6/2005 | Ziehr | B60L 58/27 62/238.7 |
| 2005/0178523 A1* | 8/2005 | Itoh | B60H 1/00385 165/42 |
| 2006/0053814 A1* | 3/2006 | Naik | B60H 1/3208 62/241 |
| 2006/0123819 A1* | 6/2006 | Choe | F25B 27/02 62/323.3 |
| 2006/0137388 A1* | 6/2006 | Kakehashi | F25B 5/02 62/524 |
| 2006/0196631 A1* | 9/2006 | Small | F25D 31/003 165/10 |
| 2007/0209380 A1* | 9/2007 | Mueller | F25B 47/025 62/260 |
| 2007/0214817 A1* | 9/2007 | Inaba | B60H 1/00885 62/239 |
| 2008/0196877 A1* | 8/2008 | Zeigler | B60H 1/00907 165/202 |
| 2008/0264088 A1* | 10/2008 | Hirsch | F25B 13/00 62/236 |
| 2009/0020620 A1* | 1/2009 | Douarre | B60H 1/00899 237/12.3 R |
| 2010/0229578 A1* | 9/2010 | Borghi | B60H 1/3226 62/324.6 |
| 2011/0296849 A1* | 12/2011 | Benson | F01K 13/006 62/434 |
| 2012/0204587 A1* | 8/2012 | Zamir | F25B 13/00 62/235.1 |
| 2012/0222438 A1* | 9/2012 | Osaka | B60H 1/00764 62/126 |
| 2013/0118707 A1* | 5/2013 | Kardos | H01M 10/615 165/42 |
| 2013/0299123 A1* | 11/2013 | Matula | F24T 10/10 165/45 |
| 2014/0033743 A1* | 2/2014 | Hancock | F25B 27/02 62/238.1 |
| 2015/0159929 A1* | 6/2015 | Hancock | F25B 27/02 62/238.4 |
| 2016/0023532 A1* | 1/2016 | Gauthier | H01M 10/6568 62/502 |
| 2016/0069594 A1* | 3/2016 | Wang | F25B 13/00 62/324.6 |
| 2016/0250906 A1* | 9/2016 | Xia | B60H 1/143 165/202 |
| 2016/0318499 A1* | 11/2016 | Yamanaka | B60L 58/27 |
| 2016/0332505 A1* | 11/2016 | Yamanaka | B60H 1/00385 |
| 2016/0339761 A1* | 11/2016 | Enomoto | B60H 1/00899 |
| 2016/0339767 A1* | 11/2016 | Enomoto | F25B 29/003 |
| 2017/0297414 A1* | 10/2017 | Beloe | B60H 1/00885 |
| 2018/0010829 A1* | 1/2018 | Taras | F25B 13/00 |
| 2018/0086177 A1* | 3/2018 | Agathocleous | B60L 58/26 |
| 2018/0178615 A1* | 6/2018 | Xia | B60H 1/00392 |
| 2018/0272830 A1* | 9/2018 | Vespa | B60H 1/00921 |
| 2018/0354344 A1* | 12/2018 | Miura | F25B 25/005 |
| 2019/0030984 A1* | 1/2019 | Zeigler | B60H 1/3213 |
| 2019/0030991 A1* | 1/2019 | Enomoto | B60H 1/00885 |
| 2019/0128146 A1* | 5/2019 | Iwama | F01K 23/101 |
| 2019/0241044 A1* | 8/2019 | Ito | B60H 1/22 |
| 2019/0329629 A1* | 10/2019 | Andrews | B60H 1/00378 |
| 2020/0031191 A1 | 1/2020 | Oh et al. | |
| 2020/0055372 A1 | 2/2020 | Urakawa | |
| 2020/0207178 A1* | 7/2020 | Makimoto | F25B 1/00 |
| 2020/0361280 A1* | 11/2020 | Hashimoto | B60H 1/00428 |
| 2022/0140413 A1* | 5/2022 | Whiteman | H01M 10/6569 429/62 |

* cited by examiner

SYSTEMS AND METHODS FOR COOLING VEHICLE COMPONENTS

CROSS-REFERENCE TO RELATED APPLICATION

This application claims the benefit of U.S. Application No. 62/994,689 filed Mar. 25, 2020, the contents of which are incorporated herein in its entirety.

FIELD OF THE INVENTION

This disclosure relates to heat transfer for components in a vehicle.

BACKGROUND

Cooling systems in vehicles are used to reduce the temperature of heat generating components such as an engine, batteries, and various electronic components of the vehicle. Electronic components such as a vehicle computer may have a separate cooling system from an engine because of the different cooling requirements of an engine and a computer system. A computer system in a vehicle may comprise multiple heat generating components such as a CPU and one or more GPUs. The cooling system for a vehicle computer system may circulate a cooling fluid that is a gas or liquid through one or more heat generating components of a vehicle. Heat is transferred to the cooling fluid as the cooling fluid comes into thermal contact with the heat generating components. An amount of heat that is transferred from the heat generating component to the cooling fluid is directly proportional to a temperature difference between the cooling fluid and the heat generating component. In short, heat transfer to reduce the temperature of a heat generating component is more efficient as the temperature of the cooling fluid is lower.

The temperature of the cooling fluid rises when heat is transferred to the cooling fluid, which lowers the efficiency of any subsequent heat transfer. Thus, the second or third heat generating components in a cooling fluid flow path may not gain the same benefit from the heat transfer as the first heat generating component in a cooling fluid flow path.

A proposed solution to the issue of lowering efficiency for heat transfer of the cooling fluid involves creating multiple parallel cooling systems in a vehicle. However, the multiple parallel cooling systems are expensive and take up valuable space in the vehicle. Another proposed solution is increasing the capacity of the cooling system so that second and third heat generating components in a cooling fluid flow path receive sufficient heat transfer from thermal contact with the cooling fluid. However, increasing capacity, such as increasing the cooling fluid flow rate, to sufficiently cool second and third heat generating components is inefficient and may provide too much cooling for a first heat generating component in a fluid flow path. There is a need in the art for a cooling system for heat generating components in a vehicle that efficiently cools multiple heat generating components.

SUMMARY

The present disclosure includes systems for cooling components in a vehicle. In an exemplary embodiment, a system includes one or more heat generating components in a vehicle and a coolant flow path connected to the two or more heat generating components. The system includes a coolant pump configured to circulate coolant through the coolant flow path and a reversing mechanism configured to reverse a direction of circulation of coolant. The system may further include one or more sensors that measure one or more properties of the one or more heat generating components and a controller configured to reverse the direction of circulation with the reversing mechanism based on measurements from the one or more sensors. The controller may be configured to periodically reverse the direction of circulation. The reversing mechanism may include one or more valves in the coolant flow path where the one or more valves are configured to reverse the direction of circulation. The reversing mechanism may be incorporated into the coolant pump. The system may further include a refrigeration mechanism in the coolant flow path that is configured to reduce the temperature of coolant where the one or more sensors are configured to measure a temperature of the one or more heat generating components. The controller may be configured to reverse the circulation of coolant to minimize a distance in the coolant flow path for coolant to travel between the refrigeration mechanism and a heat generating component that is determined based on a temperature measurement by the one or more sensors. At least one or more heat generating components may contain an electronic processing unit where the controller may be configured to reverse the direction of circulation based on an amount of processing of the electronic processing unit. The amount of processing may be determined from one or more instructions that are queued to be processed by the electronic processing unit.

Another general aspect is a method that includes cooling one or more heat generating components in a vehicle with coolant that is circulated through a coolant flow path by a coolant pump and reversing a direction of circulation of the coolant with a reversing mechanism. The method may further include measuring one or more properties of the one or more heat generating components where a controller is configured to reverse the direction of circulation with the reversing mechanism based on measurements from the one or more sensors. The controller may be configured to periodically reverse the direction of circulation. The reversing mechanism may include one or more valves in the coolant flow path where the one or more valves are configured to reverse the direction of circulation. The reversing mechanism may be incorporated into the coolant pump. The method may further include reducing the temperature of coolant in the coolant flow path with a refrigeration mechanism where the one or more sensors are configured to measure a temperature of the one or more heat generating components. The controller may be configured to reverse the circulation of coolant to minimize a distance in the coolant flow path for coolant to travel between the refrigeration mechanism and a heat generating component that is determined based on a temperature measurement by the one or more sensors. At least one of the one or more heat generating components may contain an electronic processing unit where the controller is configured to reverse the direction of circulation based on an amount of processing of the electronic processing unit. The amount of processing may be determined from one or more instructions that are queued to be processed by the electronic processing unit.

In an exemplary embodiment, a system includes one or more electronic processing units in a vehicle and a coolant flow path connected to the one or more electronic processing units. The system includes a coolant pump configured to circulate coolant through the coolant flow path and a reversing mechanism configured to reverse a direction of circulation of coolant. The system includes one or more sensors that measure one or more properties of the one or more electronic processing units and a controller configured to reverse the direction of circulation with the reversing mechanism based on measurements from the one or more sensors. The controller may be configured to reverse the direction of circulation based on a processing load of the one or more electronic processing units. The controller may be configured to periodically reverse the direction of circulation with a period of time that is based on the processing load of the one or more electronic processing units. The period of time may be further based on measurements of properties of the one of more electronic processing units.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the present disclosure are utilized, and the accompanying drawings of which:

DETAILED DESCRIPTION

The disclosed subject matter is a system for cooling heat generating components in a vehicle by reversing a direction of circulation of coolant flow. A heat generating component in a cooling flow path that is cooled first is cooled to a greater degree than additional heat generating components that are subsequently cooled in the cooling system. To correct the imbalance, the disclosed subject matter describes a system whereby a direction of circulation of cooling flow may be reversed such that the order of cooling for heat generating components is also reversed.

The various heat generating components of a vehicle may have cooling needs that vary during the operation of the vehicle. For example, a vehicle may include a CPU and a GPU as part the electronics system of the vehicle. The CPU and GPU may require cooling based on instructions that are unpredictably initiated by a passenger of the vehicle. Both the CPU and the GPU may generate heat when they process instructions and may require active cooling to remain within an optimal temperature range.

The system may include sensors on one or more heat generating components to determine the cooling need of the heat generating component. The system may also include a controller that can receive measurements from the sensors. The sensors may measure various properties of the heat generating components such as temperature and processing output. The controller may determine when the direction of circulation of the cooling system should be reversed based on measurements from the sensors. In various embodiments, the controller may be configured to reverse the direction of circulation of the cooling system periodically to maintain balanced cooling for the various heat generating components.

The direction of circulation may be reversed by a reversing mechanism. In various embodiments, the reversing mechanism may be a pump that is configured to have the ability to pump in a reverse direction. In an exemplary embodiment, the reversing mechanism may be a set of valves in a coolant flow path that, when activated, can switch the direction of circulation of coolant in the coolant flow path.

In an exemplary embodiment, the cooling system may include one or more batteries that generate heat and require cooling. The various portions of the one or more batteries may cool at different rates based on the direction that coolant flows. By periodically reversing a direction of circulation of coolant, the batteries may be cooled more evenly.

Figure 1:
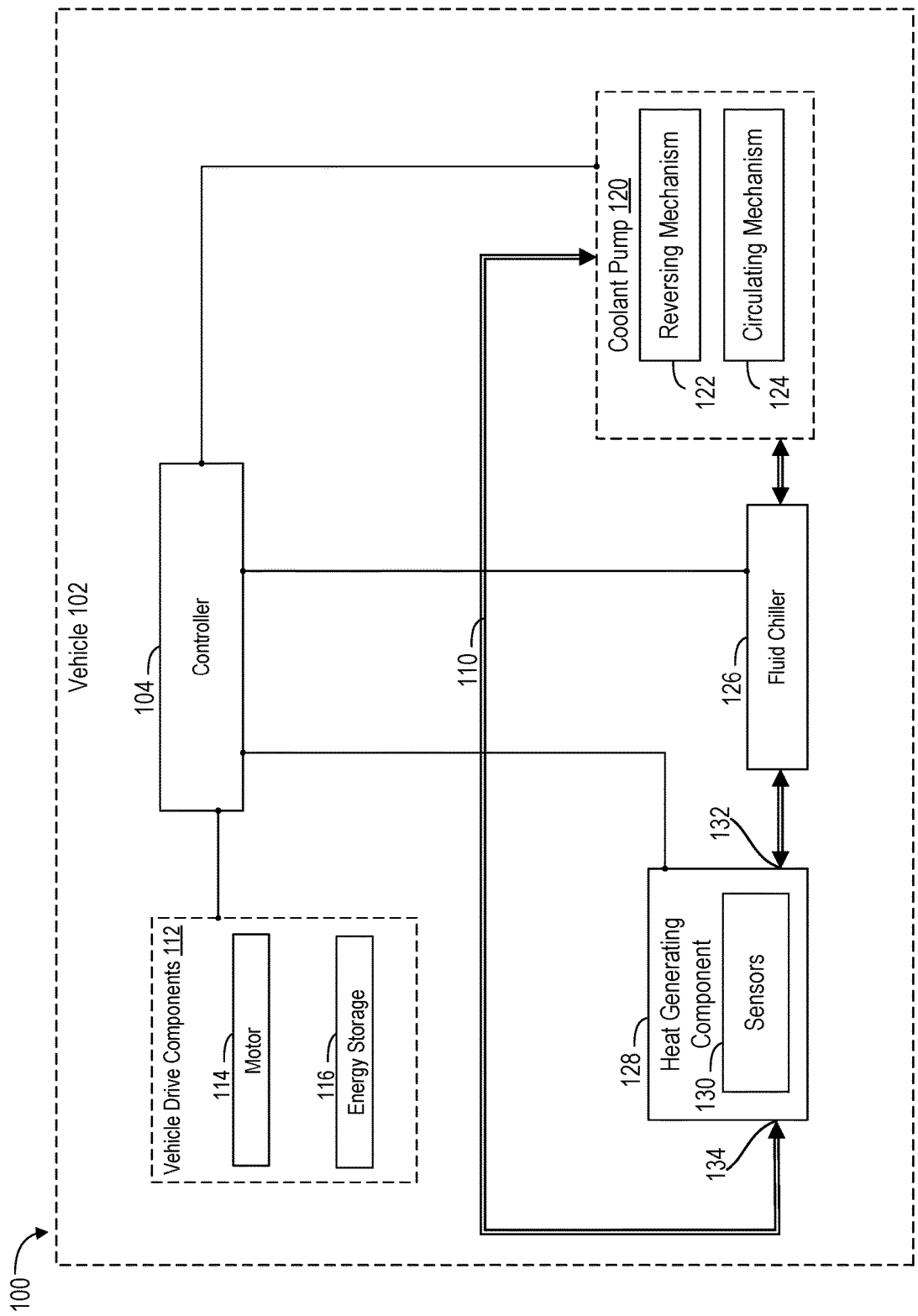
FIG. 1 is a schematic of a cooling system illustrating the components that may be used in an embodiment of the disclosed subject matter.

Referring to FIG. 1, FIG. 1 is a schematic of a cooling system 100 illustrating the components that may be used in an embodiment of the disclosed subject matter. The cooling system 100 may be used to efficiently transfer heat from heat generating components in a vehicle 102 that are in contact with cooling fluid that flows in a coolant fluid flow path 110. The vehicle 102 may be various machines that are used to transport people or things including, but not limited to: automobiles, motorcycles, trucks, trains, airplanes, helicopters, and boats. The coolant in the coolant fluid flow path 110 is a fluid that may be a gas or a liquid. In various embodiments, the coolant is water. In an exemplary embodiment, the coolant is ethylene glycol or related chemicals commonly referred to as antifreeze.

The coolant fluid flow path 110 may flow through a coolant pump 120, a fluid chiller 126, and a heat generating component 128. The coolant fluid flow path 110 may contain coolant that is propelled by the coolant pump 120. The coolant in the coolant fluid flow path 110 may come into thermal contact and transfer heat with various components in the coolant fluid flow path 110. When in thermal contact, the coolant and heat generating component 128 will transfer heat with one another. Heat transfers from objects or substances of higher temperature to objects or substances of lower temperature.

The coolant pump 120 may comprise a circulating mechanism 124 in the coolant fluid flow path 110 that creates motion of the coolant in the coolant fluid flow path 110. In various embodiments, the circulating mechanism 124 may be a centrifugal pump that generates pressure by rotating coolant around an impeller. In an exemplary embodiment, the circulating mechanism 124 may be a rotary pump that rotates one or more components to displace and force a fluid in a desired direction of circulation. Various types of pumps may contain a reversing mechanism 122, whereby the pump may operate in a reverse direction. A rotary pump may operate in a reverse direction while a centrifugal pump may only operate in a forward direction.

The reversing mechanism 122 may be incorporated in the coolant pump 120, as shown in FIG. 1. When the coolant pump is a rotary pump, the reversing mechanism 122 may be a mechanism that allows the rotary pump to operate in a reverse direction. In various embodiments, the reversing mechanism is a set of valves that, when activated, reverse the direction of circulation of coolant around the coolant fluid flow path 110. In various embodiments, the set of valves that make up the reversing mechanism may be incorporated into the coolant pump 120. As shown in FIG. 1, the cooling system 100 has a single reversing mechanism 122. In an exemplary embodiment, the reversing mechanism 122 may be separate from the coolant pump 120. In various embodiments, the cooling system 100 may have more than one reversing mechanism 122.

The fluid chiller 126 reduces the temperature of coolant flowing into contact with the fluid chiller 126. The fluid chiller 126 may comprise a refrigeration mechanism that actively lowers the temperature of coolant that flows through the fluid chiller 126. In an exemplary embodiment, the fluid chiller 126 comprises a compressor, an expansion valve, and an evaporator. The compressor compresses a refrigerant gas into a high pressure. The refrigerant may condense into a liquid in the compressor. The expansion valve expands the volume of the space holding the refrigerant, reducing the temperature of the refrigerant. In the evaporator, the cold refrigerant comes into thermal contact with coolant. The coolant transfers heat to the cold refrigerant causing the refrigerant to evaporate back into a gas.

In various embodiments, the fluid chiller 126 is a radiator of the vehicle 102 that cools coolant that passes through it. The radiator may contain thin tubes that are exposed to air that passes the vehicle 102 while the vehicle 102 is in motion. The thin tubes of the radiator are incorporated into the coolant fluid flow path 110. Coolant is cooled as the coolant flows through the radiator. In various embodiments, the cooling system 100 may include more than one fluid chiller 126. For example, the cooling system 100 may include a refrigerated chiller and a radiator. The refrigerated chiller may reduce the temperature of the coolant more effectively than a radiator and thus may be used on the most sensitive heat generating components such as batteries.

Coolant may come into thermal contact with the heat generating component 128 to effectuate heat transfer with the heat generating component 128. In various embodiments, the temperature of the coolant is lowered by the fluid chiller 126 before coming into thermal contact with the heat generating component 128. Heat may be transferred from the heat generating component 128 to the coolant in the coolant fluid flow path 110, thus lowering the temperature of the heat generating component 128. In various embodiments, cooling system 100 may be configured to raise the temperature of the heat generating component 128. For example, batteries in the vehicle 102 may require warming when the batteries are below a temperature range.

The heat generating component 128 may incorporate one or more sensors 130 that measure one or more properties of the heat generating component 128. In an exemplary embodiment, the sensors 130 may measure a temperature of the heat generating component 128. A heat generating component 128 may have multiple temperature sensors. For example, the heat generating component 128 may include a temperature sensor at a front 132 of the heat generating component 128 and a temperature sensor at a back 134 of the heat generating component 128. When the temperature sensors indicate that the back 134 is significantly higher in temperature than the front 132, the direction of circulation of coolant may be reversed such that coolant enters the heat generating component 128 through the back 134 and exits from the front 132. Also, in an exemplary embodiment, the sensors 130 may measure an output of the heat generating component 128 such as an amount of processing by the heat generating component 128. The direction of the circulation of the coolant may be reversed based on output of the heat generating component 128.

The controller 104 may send signals that, when executed, reverse the direction of circulation of coolant in the coolant fluid flow path 110. The controller 104 may include a processor and memory. Measurements from the sensors 130 may be transmitted to the controller 104. Based on the measurements, the controller 104 may determine a direction of circulation. For example, the controller 104 may determine a direction of circulation that minimizes a distance in the coolant fluid flow path 110 for coolant to travel between the fluid chiller 126 and a heat generating component 128 that has a high temperature measurement. In various embodiments, the controller 104 may be configured to determine a period by which the direction of circulation is continuously reversed.

The vehicle 102 may include vehicle drive components 112 that effectuate the motion of the vehicle 102. The vehicle drive components 112 may include components that convert energy into motion that propels the vehicle 102 and components that direct the motion of the vehicle 102. In an exemplary embodiment, the vehicle drive components 112 may include a motor 114 and energy storage 116. The motor 114 may convert energy storage 116 into mechanical motion that moves the vehicle. In various embodiments, the motor 114 is an internal combustion engine that converts the energy in liquid fuel into mechanical motion. In an exemplary embodiment, the motor 114 is an electric motor that converts electrical energy from batteries into mechanical motion. The batteries may be a heat generating component 128 that are in thermal contact with coolant in the coolant fluid flow path 110.

Figure 2:
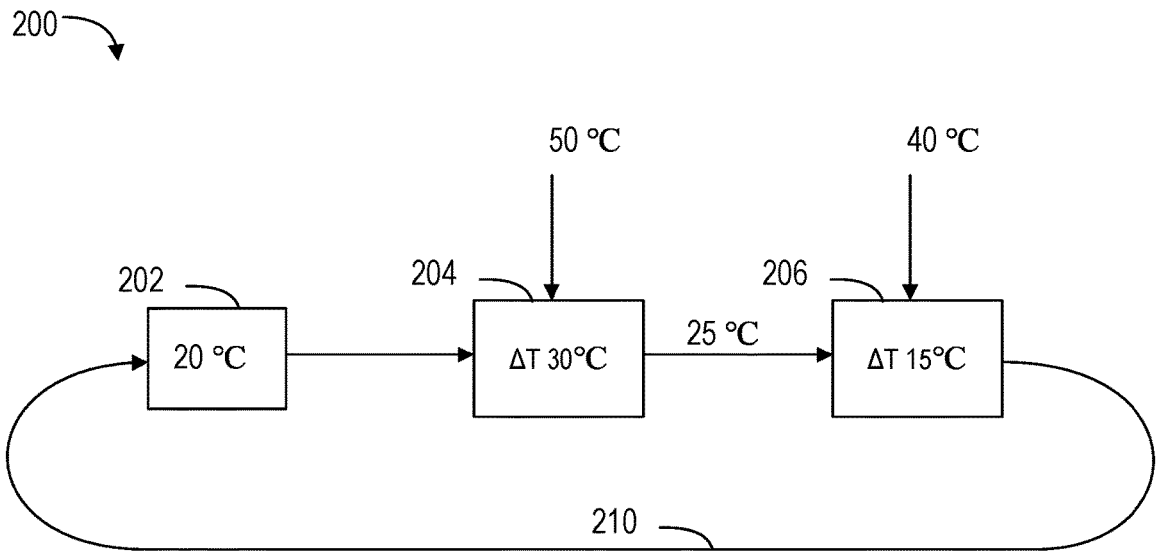
FIG. 2 is a schematic of a cooling system circulating in a forward direction with two heat generating components.

Referring to FIG. 2, FIG. 2 is a schematic of a cooling system 200 circulating in a forward direction with two heat generating components. The cooling system 200 may include a pump and chiller 202, a first heat generating component 204, and a second heat generating component 206 on a coolant fluid flow path 210. The pump and chiller 202 may cool and circulate coolant through the coolant fluid flow path 210.

As indicated in FIG. 2, the pump and chiller circulates coolant at 20° C. The coolant is circulated in a clockwise direction through the coolant fluid flow path 210. The 20° C. coolant is propelled from the pump and chiller 202 to the first heat generating component 204. As indicated, the first heat generating component 204 is 50° C. and the difference in temperature is 30° C. The efficiency of heat transfer from the first heat generating component 204 to the coolant is directly proportional to the difference in temperature.

Figure 3:
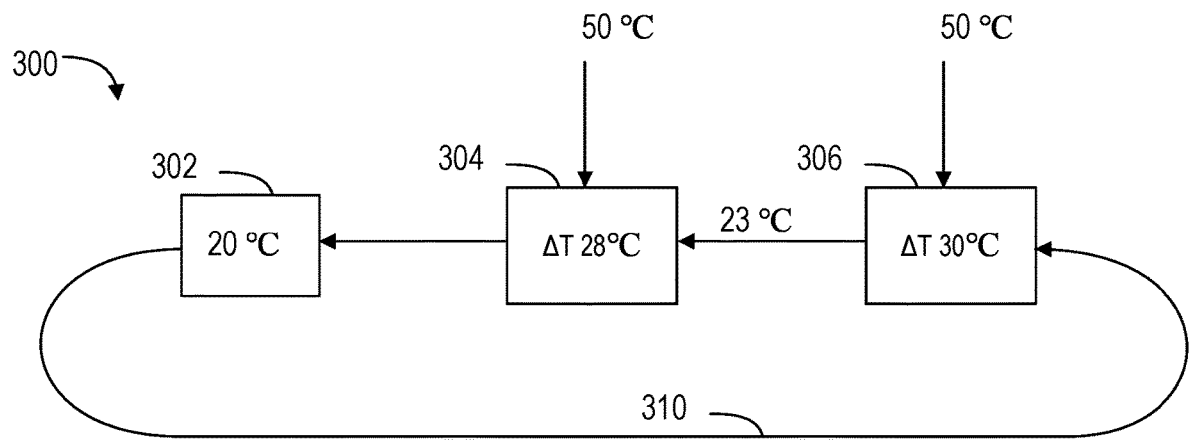
FIG. 3 is a schematic of a cooling system circulating in a reverse direction with two heat generating components.

As shown in FIG. 2, the coolant rises in temperature to 25° C. after the first heat generating component 204 transfers heat to the coolant. The second heat generating component 206 is 40° C. The temperature difference between the coolant and the second heat generating component 206 is 15° C. Thus, the efficiency of heat transfer between the second heat generating component 206 and the coolant, which is proportional to the temperature difference, is lower for the second heat generating component 206 than for the first heat generating component 204. The coolant flows through the coolant fluid flow path 210 to the pump and chiller 202 after receiving heat from the second heat generating component 206. In various embodiments, the pump and chiller 202 may reverse the direction of circulation of coolant based on the temperature of one or more heat generating components. As shown in FIG. 3, the direction of circulation may be reversed.

Referring to FIG. 3, FIG. 3 is a schematic of a cooling system 300 circulating in a reverse direction with two heat generating components. The efficiency of heat transfer between the first heat generating component 304 and the coolant may be dependent on the direction of circulation of coolant. As shown in FIG. 3, the pump and chiller 302 propels coolant in a counterclockwise direction to circulate through the coolant fluid flow path 310. The pump and chiller 302 is propelling coolant at 20° C. to the second heat generating component 306, which has a temperature of 50° C.

The temperature difference between the second heat generating component 306 and the coolant is 30° C. when heat is transferred from the second heat generating component 306 to the coolant. The temperature of the coolant rises to 23° C. after the heat transfer. The temperature of the first heat generating component 304 is 50° C. The temperature difference between the first heat generating component 304 and the coolant is 28° C.

Figure 4:
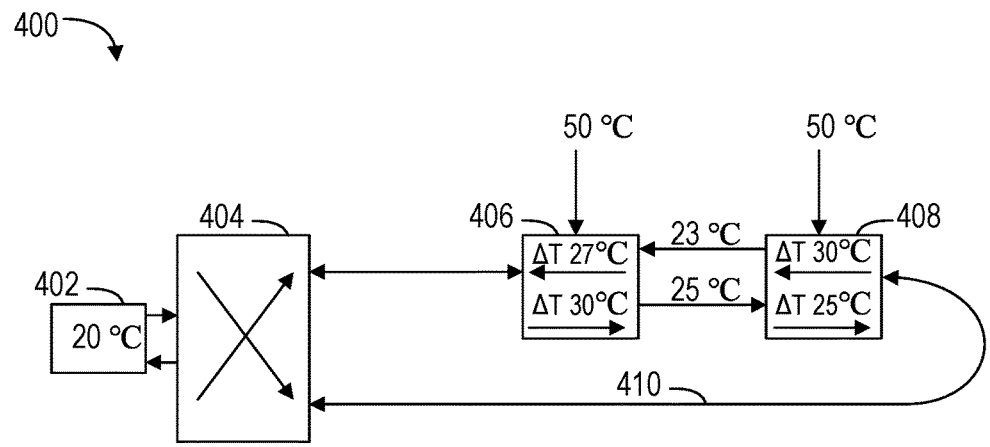
FIG. 4 is a schematic of a cooling system with a reversing valve that may circulate in both a forward and a reverse direction with two heat generating components.

Referring to FIG. 4, FIG. 4 is a schematic of a cooling system 400 with a reversing mechanism 404 that may circulate coolant in both a forward and a reverse direction with two heat generating components. As shown in FIG. 4, a pump and chiller 402 propels coolant at 20° C. to a reversing mechanism 404. The pump and chiller 402 also receives coolant from the reversing mechanism 404 after the coolant has circulated through a coolant fluid flow path 410.

As indicated by the double arrows, the reversing mechanism 404 is configured to direct the coolant to circulate in either a clockwise direction or a counterclockwise direction. The reversing mechanism 404 may be in a forward state, whereby coolant is directed in a clockwise direction through the coolant fluid flow path 410. Alternatively, the reversing mechanism 404 may be in a reverse state, whereby coolant is directed in a counterclockwise direction through the coolant fluid flow path 410. The pump and chiller 402 may circulate fluid in a single direction as the reversing mechanism 404 switches between the forward state and the reverse state.

When the reversing mechanism 404 is in a forward state, the coolant at 20° C. is directed to the first heat generating component 406, which has a temperature of 50° C. The temperature difference is 30° C. After heat is transferred from the first heat generating component 406 to the coolant, the coolant temperature rises to 25° C. The coolant is directed to the second heat generating component 408, which has a temperature of 50° C. The temperature difference between the coolant and the second heat generating component 408 is 25° C. The coolant is directed back to the reversing mechanism 404 after exchanging heat with the second heat generating component 408.

When the reversing mechanism 404 is in a reverse state, the coolant at 20° C. is circulated in a counterclockwise direction to the second heat generating component 408, which is at 50° C. The temperature difference between the second heat generating component 408 and the coolant is 30° C. As indicated by FIG. 4, the temperature of the coolant may rise to 23° C. after exchanging heat with the second heat generating component 408. The coolant is directed to the first heat generating component 406, which is at a temperature of 50° C. The temperature difference between the first heat generating component 406 and the coolant is 27° C. After exchanging heat with the first heat generating component 406, the coolant is circulated back to the reversing mechanism 404.

Figure 5:
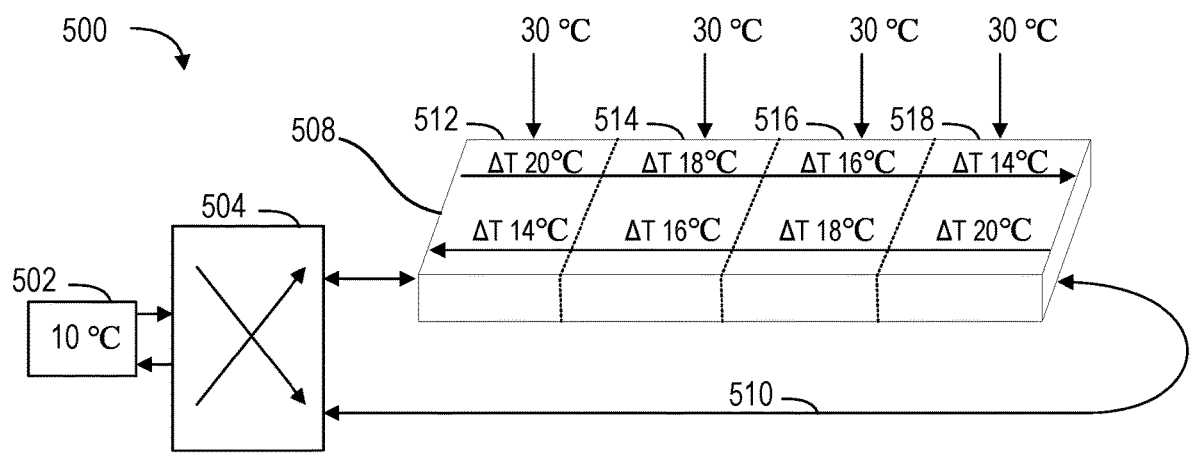
FIG. 5 is a schematic of a cooling system with a reversing valve that may circulate in both a forward and a reverse direction with a single heat generating component that has multiple portions.

Referring to FIG. 5, FIG. 5 is a schematic of a cooling system 500 with a reversing valve 504 that may circulate coolant in both a forward and a reverse direction with a single heat generating component 508 that has multiple portions. A pump and chiller 502 may chill and circulate coolant into a reversing valve 504 that can direct the coolant in a clockwise or a counterclockwise direction in a coolant fluid flow path 510. The single heat generating component 508 may be large enough that various portions of the single heat generating component 508 may have different temperatures.

As shown in FIG. 5, the single heat generating component 508 is arbitrarily divided into four portions. When coolant flows in a clockwise direction, the coolant at 10° C. may enter the single heat generating component 508 in a first portion 512 that is at 30° C. As indicated by FIG. 5, the temperature difference is 20° C. The coolant and first portion may exchange heat such that the coolant increases in temperature to 12° C. by the time the coolant enters the second portion 514 that is at 30° C. As indicated by FIG. 5, the temperature difference between the coolant and the second portion is 18° C. Similarly, the coolant gradually increases in temperature as the coolant flows through the single heat generating component 508 such that the temperature difference is 16° C. in the third portion 516 and 14° C. in the fourth portion 518.

The coolant may flow through the coolant fluid flow path 510 in a counterclockwise direction when the reversing mechanism is switched to a reverse state. When flowing in the counterclockwise direction the coolant at 10° C. may enter the single heat generating component 508 in the fourth portion 518 which is at 30° C. As indicated by FIG. 5, the temperature difference is 20° C. The coolant gradually increases in temperature as heat is transferred from the single heat generating component 508 to the coolant such that the temperature difference is 18° C. in the third portion 516, 16° C. in the second portion 514, and 14° C. in the first portion 512.

As shown in FIG. 5, the temperature of the coolant rises as the coolant flows through the single heat generating component 508 which results in a gradually lowering temperature difference. Because the rate of heat transfer is proportional to the temperature difference, the efficiency of heat transfer also decreases as the coolant flows through the single heat generating component 508. If the coolant were to flow in only one direction, the various portions of the single heat generating component 508 may cool at different rates and acquire different temperatures. In an exemplary embodiment, the single heat generating component 508 may comprise a vehicle battery. Portions of the battery may degrade at various rates depending on the operating temperature of the portion. Thus, the battery may benefit from reversing the direction of circulation of coolant such that the temperature of the various portions of the battery is close to the same on average.

Figure 6:
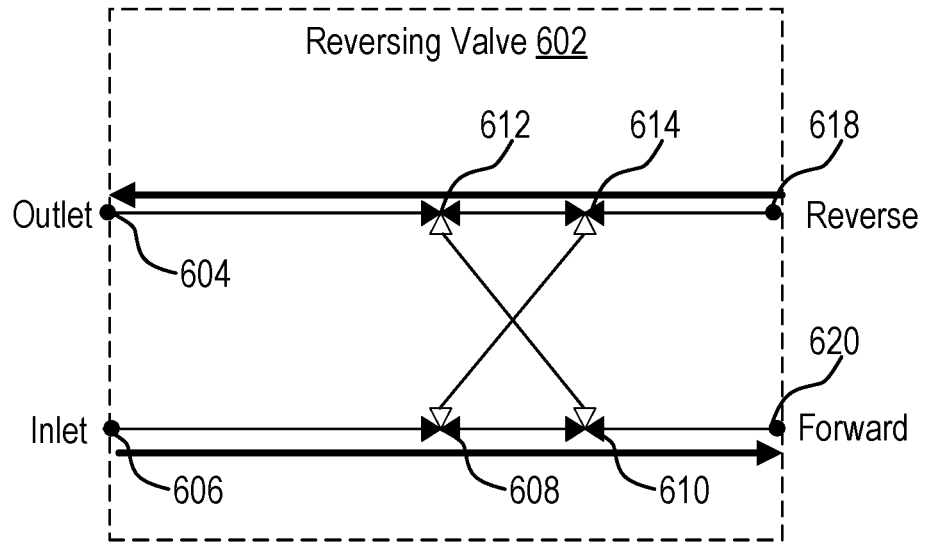
FIG. 6 is a schematic of an embodiment of a reversing valve in a forward circulation state.

Referring to FIG. 6, FIG. 6 is a schematic 600 of an embodiment of a reversing mechanism that comprises a reversing valve 602 in a forward circulation state. The reversing valve 602 may be configured to direct coolant, that flows into an inlet 606, in a forward or reverse direction through the coolant fluid flow path 110. When the reversing valve 602 is in a forward circulation state, as shown in FIG. 6, coolant is directed in a forward direction. Alternately, coolant is directed in a reverse direction when the reversing valve is in a reverse circulation state.

Coolant may enter the reversing valve at an inlet 606. When the reversing valve 602 is in a forward circulation state, coolant may be directed to a forward port 620, as shown by the arrow leading from the inlet 606 to the forward port 620. Coolant that exits the reversing valve 602 through the forward port 620 may circulate through the coolant fluid flow path 110 and enter the reversing valve through the reverse port 618. As shown by the arrow that leads from the reverse port 618 to the outlet 604, coolant that enters the reversing valve 602 through the reverse port 618 may be directed to the outlet 604 of the reversing valve 602.

Figure 7:
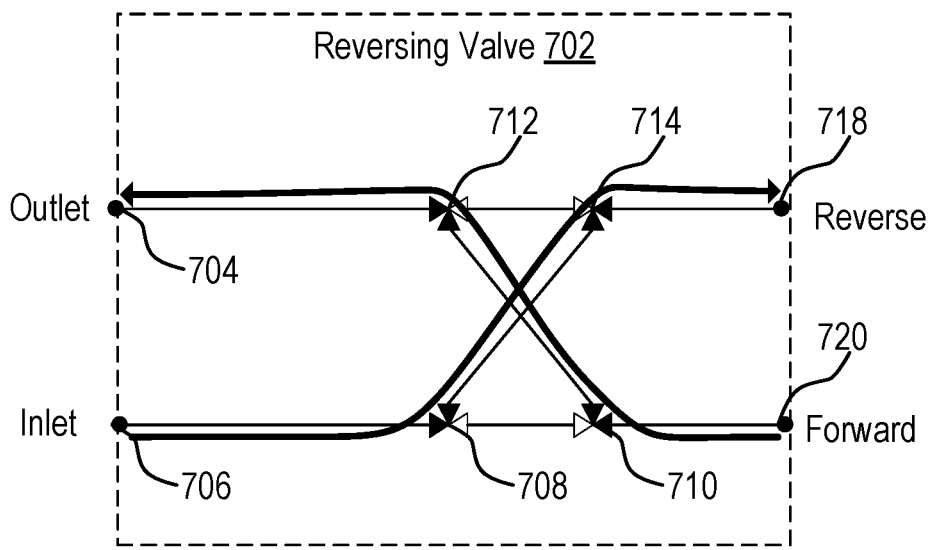
FIG. 7 is a schematic of an embodiment of a reversing valve in a reverse circulation state.

In the exemplary embodiment shown in FIG. 6, the reversing valve 602 includes four three-way valves. The four three-way valves indicated at 608, 610, 612, and 614 may switch the reversing valve 602 between a forward circulation state and a reverse circulation state. As shown in FIG. 6, valve 608 and valve 610 are configured to direct coolant from the inlet 606 to the forward port 620 when the reversing valve is in a forward circulation state. And also shown in FIG. 6, valve 614 and valve 612 are configured to direct coolant that enters the reversing valve 602 from the reverse port 618 to the outlet 604 when the reversing valve 602 is in a forward circulation state. Alternatively, and as shown in FIG. 7, when the reversing valve 602 is in a reverse circulation state, coolant may be directed from the inlet 606 to a reverse port 618. Likewise, coolant may be directed from the forward port 620 to the outlet 604 when the reversing valve 602 is in a reverse circulation state.

Referring to FIG. 7, FIG. 7 is a schematic 700 of an embodiment of a reversing valve 702 in a reverse circulation state. The four three-way valves in the reversing valve 702 may be activated to switch the reversing valve from directing coolant in one direction into another direction. As shown in FIG. 7 by the arrow leading from the inlet 706 to the reverse port 718, coolant that enters the reversing valve 702 at the inlet 706 is directed to the reverse port 718. And as shown by the arrow leading from the forward port 720 to the outlet 704, coolant that enters the reversing valve at the forward port 720 is directed to the outlet 704 when the reversing valve 702 is in a reverse circulation state.

As shown in FIG. 7, valve 708 and valve 714 are configured to direct coolant from the inlet 706 to the reverse port 718. Valve 710 and valve 712 are configured to direct coolant from the forward port 720 to the outlet 704. In an exemplary embodiment, the three-way valves in the reversing valve 702 may be switched between a forward circulation state and a reverse circulation state responsive to a signal that is sent from the controller 104. Also, in an exemplary embodiment, the cooling system 100 may include more than one reversing valve 702. In various embodiments, coolant may enter the reversing valve 702 through the outlet 704 and exit through the inlet 706 based on the direction of circulation of coolant that enters the reversing valve 702.

Figure 8:
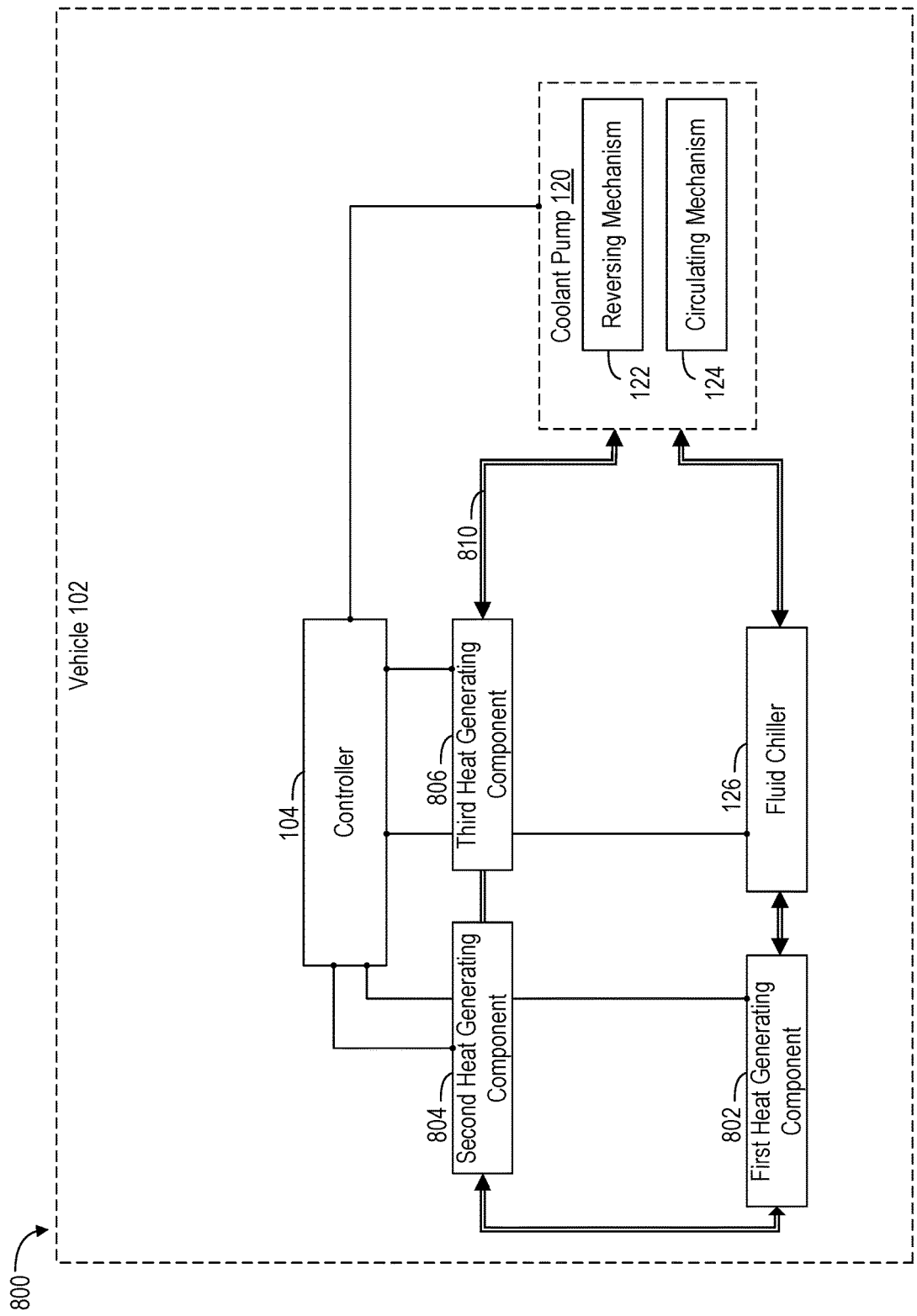
FIG. 8 is a schematic of a cooling system illustrating the components that may be used in an embodiment of the disclosed subject matter with multiple heat generating components.

Referring to FIG. 8, FIG. 8 is a schematic of a cooling system 800 illustrating the components that may be used in an embodiment of the disclosed subject matter with multiple heat generating components. As shown in FIG. 8, the cooling system 800 may include more than one heat generating component. The heat generating components may comprise various vehicle components that generate heat and require cooling from coolant that flows through a coolant fluid flow path 810.

The heat generating components may incorporate sensors that measure one or more properties of the heat generating components. The measurements of the one or more properties of the heat generating components may be transmitted to the controller 104. The controller 104 may determine a direction of circulation of the cooling system 800 based on the measurements of the one or more properties of the heat generating components.

As shown in FIG. 8, a first heat generating component 802, a second heat generating component 804, and a third heat generating component 806 may be fluidly connected to a coolant fluid flow path 810. Coolant may be circulated through the coolant fluid flow path by the circulating mechanism 124 of the coolant pump 120. When the coolant is circulated in a forward direction by the circulating mechanism 124, the coolant may be forced from the circulating mechanism through the fluid chiller 126 to the first heat generating component 802. Heat transfer may be effectuated between the first heat generating component 802 and the coolant, which may cool the first heat generating component 802 and warm the coolant.

The coolant may be propelled from the first heat generating component 802 to the second heat generating component 804 where heat transfer is effectuated between the second heat generating component 804 and the coolant. The second heat generating component 804 may be cooled and the coolant may be warmed by the heat transfer. Similarly, the coolant may be propelled from the second heat generating component 804 to the third heat generating component 806 where the third heat generating component 806 may be cooled and the coolant may be further warmed.

The direction of circulation of coolant in the coolant fluid flow path 810 may be reversed by the reversing mechanism 122 such that coolant is propelled from the circulating mechanism to the third heat generating component 806. The reversing mechanism 122 may switch the direction of circulation of coolant in the coolant fluid flow path 810 responsive to an instruction from the controller 104. In an exemplary embodiment, the controller 104 may determine the direction of circulation based on temperature measurements from sensors in the heat generating components. For example, the controller 104 may determine that the cooling system 800 should circulate in the reverse direction based on a high temperature measurement from the third heat generating component 806. In the reverse direction, the coolant flows from the fluid chiller 126 to the third heat generating component 806 without being warmed by the other heat generating components. Thus, the coolant may have a lower temperature when it flows in the reverse direction than in the forward direction when the coolant comes into thermal contact with the third heat generating component 806.

Likewise, the coolant may have a lower temperature when it flows in the forward direction when the coolant comes into thermal contact with the first heat generating component 802.

In an exemplary embodiment, the controller 104 may be configured to change the direction of circulation periodically. The direction of circulation may be transitioned back and forth based on a timer. By periodically changing the direction of circulation of coolant in the cooling system 800, the heat generating components may each receive a similar amount of heat transfer on average from thermal contact with the coolant. The period of time before each transition may be pre-set by the controller 104. Alternatively, the controller 104 may determine a period of time based on the measurements from sensors in the heat generating components. The period of time in the forward and reverse directions may be the same or unequal. In one example where the first heat generating component 802 has a greater cooling need than the third heat generating component 806, the controller 104 may be configured to hold the reversing mechanism in the forward circulation state for a longer period of time than the reverse circulation state.

Figure 9:
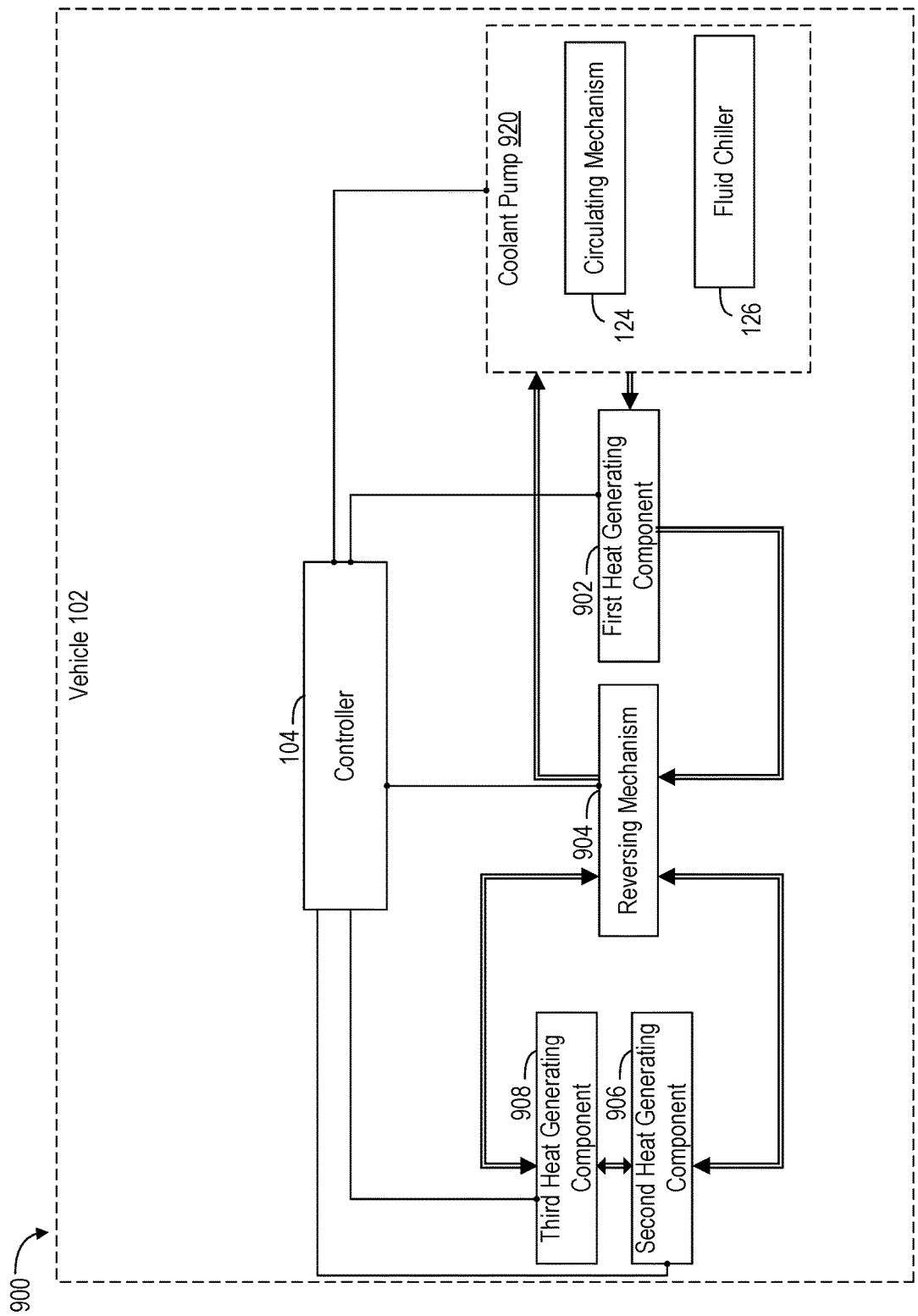
FIG. 9 is a schematic of a cooling system illustrating the components that may be used in an embodiment of the disclosed subject matter with a reversing mechanism placed in between a first heat generating component and the second and third heat generating components.

Referring to FIG. 9, FIG. 9 is a schematic of a cooling system 900 illustrating the components that may be used in an embodiment of the disclosed subject matter with a reversing mechanism 904 placed in between a first heat generating component 902 and the second and third heat generating components. A coolant pump 920 may incorporate the circulating mechanism 124 and the fluid chiller 126 such that the coolant pump 920 circulates and chills coolant.

As shown in FIG. 9, the coolant may be circulated to the first heat generating component 902 directly from the coolant pump 920. Thus, the coolant may have a lower temperature when the coolant comes into thermal contact with the first heat generating component 902 than the other heat generating components. The coolant may be directed to the reversing mechanism 904 from the first heat generating component 902. In an exemplary embodiment, the reversing mechanism 904 may comprise the reversing valve shown in FIG. 6.

As shown in FIG. 9, coolant may be directed from the reversing mechanism 904 to one of either the second heat generating component 906 or the third heat generating component 908. The reversing mechanism 904 may switch a direction of circulation for coolant that is circulated to the third and second heat generating components based on a signal from the controller 104. In an exemplary embodiment, the controller 104 may determine a direction of circulation based on measurements of properties of the second heat generating component 906 and/or the third heat generating component 908. Also, in an exemplary embodiment, the controller 104 may switch the direction of circulation periodically.

Figure 10:
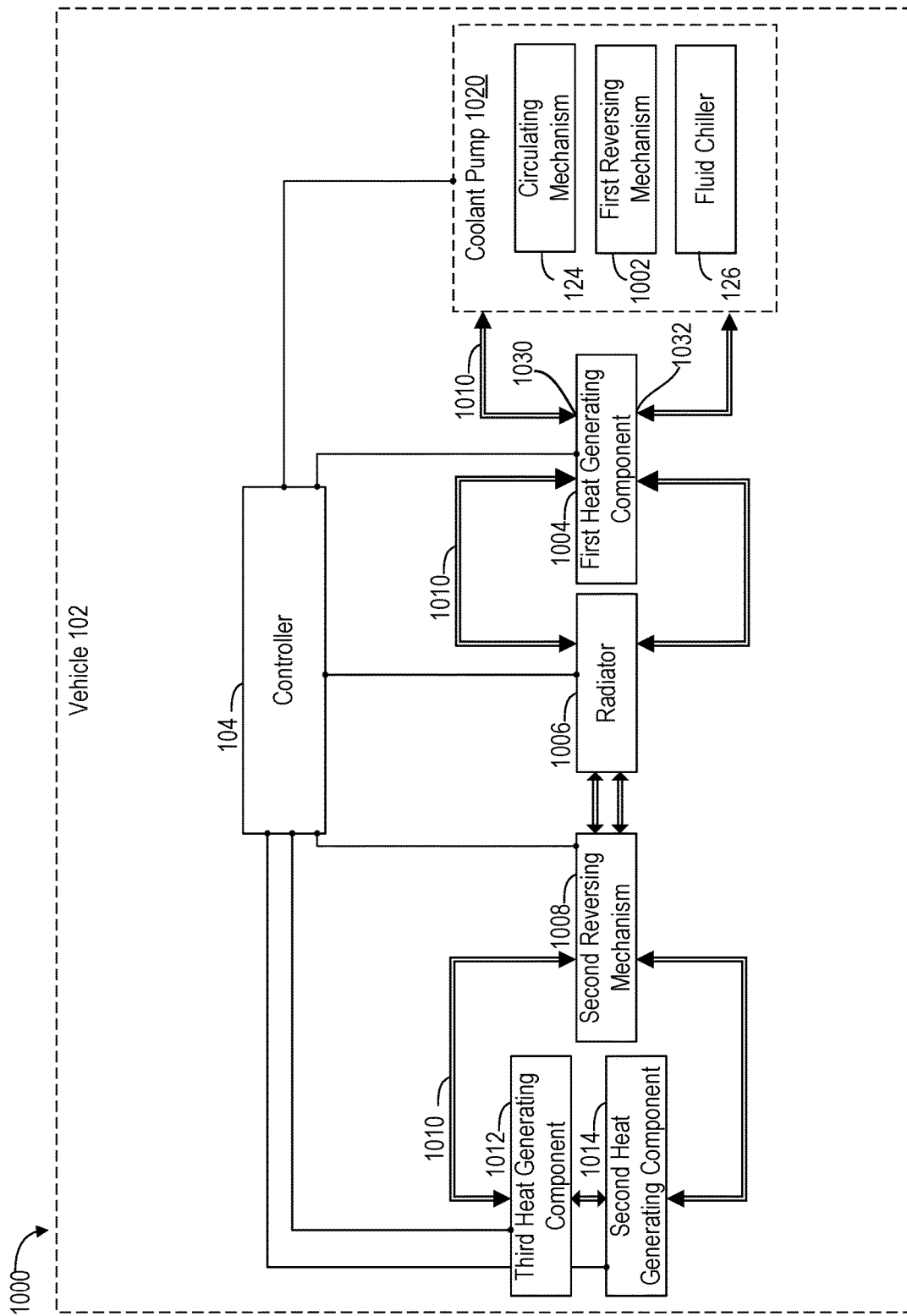
FIG. 10 is a schematic of a cooling system illustrating the components that may be used in an embodiment of the disclosed subject matter with multiple cooling components.

Referring to FIG. 10, FIG. 10 is a schematic of a cooling system 1000 illustrating the components that may be used in an embodiment of the disclosed subject matter with multiple cooling components. In the embodiment shown in FIG. 10, the cooling system 1000 has two components that cool coolant that flows on the coolant fluid flow path 1010. The fluid chiller 126 and the radiator 1006 may extract heat from coolant that comes into thermal contact with them.

As shown in FIG. 10, the coolant pump 1020 may include the circulating mechanism 124, the fluid chiller 126, and a first reversing mechanism 1002. Coolant may be directed from the coolant pump 1020 to the first heat generating component 1004 in a forward direction or a reverse direction. In various embodiments, the coolant fluid flow path 1010 may be fluidly connected to the first heat generating component 1004 such that the coolant may enter the first heat generating component 1004 at a first position 1030 or a second position 1032 depending upon the direction of circulation.

Coolant may be directed from the first heat generating component 1004 to a radiator 1006, which may exchange heat with the coolant to lower the temperature of the coolant. The coolant may flow from the radiator 1006 to a second reversing mechanism 1008. The second reversing mechanism 1008 may direct the direction of circulation of the coolant as the coolant comes into thermal contact with the second heat generating component 1014 and the third heat generating component 1012. The order in which the coolant exchanges heat with the second heat generating component 1014 and the third heat generating component 1012 may be directed by the state of the second reversing mechanism 1008. In various embodiments, the controller 104 may determine the state of the second reversing mechanism 1008 based on measurements from sensors in the second heat generating component 1014 and the third heat generating component 1012.

Figure 11:
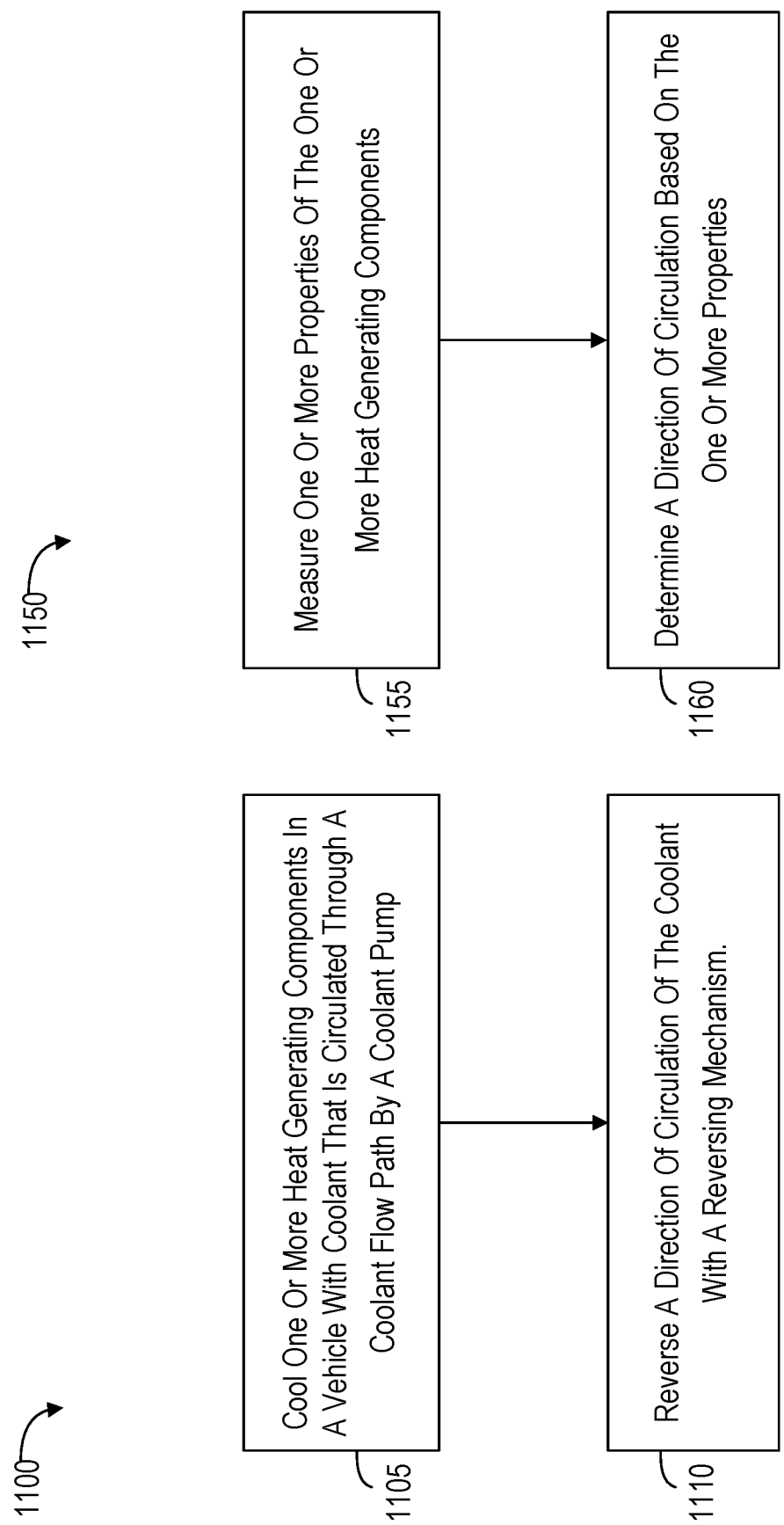
FIG. 11A is a flow diagram for a process of cooling heat generating components by reversing a direction of circulation of coolant.
FIG. 11B is a flow diagram for a process of cooling heat generating components by reversing a direction of circulation of coolant based on one or more properties of heat generating components.

Referring to FIG. 11A, FIG. 11A is a flow diagram 1100 for a process of cooling heat generating components by reversing a direction of circulation of coolant. The process may be employed to evenly cool heat generating components. The efficiency of heat transfer from the heat generating components lowers when coolant becomes warmer as a result of coolant exchanging heat with heat generating components on the coolant fluid flow path 110. The heat generating components may be cooled more evenly by reversing the direction of circulation of coolant.

At step 1105, the cooling system 100 may cool one or more heat generating components 128 in a vehicle 102 with coolant that is circulated through a coolant flow path by a coolant pump 120. The one or more heat generating components 128 are cooled through thermal contact with coolant that has a lower temperature than the heat generating component 128. The coolant may be cooled by a fluid chiller 126 in the vehicle 102.

At step 1110, the cooling system 100 may reverse a direction of circulation of the coolant with a reversing mechanism 122. The reversing mechanism 122 may comprise various mechanisms including, but not limited to: a part of the coolant pump 120 or a reverse valve. In various embodiments, the reversing mechanism 122 may receive signals from the controller 104 that, when executed, cause the reversing mechanism 122 to switch the direction of circulation to a forward direction or a reverse direction.

Referring to FIG. 11B, FIG. 11B is a flow diagram for a process 1150 of cooling heat generating components 128 by reversing a direction of circulation of coolant based on one or more properties of heat generating components 128. The process 1150 may be used to switch a direction of circulation in response to active monitoring of the cooling system 100. The monitoring of the cooling system 100 may be accomplished with a controller 104 that receives signals from various components of the cooling system 100.

At step 1155, a sensor 130 may measure one or more properties of the one or more heat generating components. The sensor 130 may be incorporated into the heat generating component 128 or may be separate from the heat generating component 128. In various embodiments, one sensor 130 may measure properties of more than one heat generating component 128. The measurement may be transmitted from the sensor 130 to the controller 104.

At step 1160, the controller may determine a direction of circulation based on the one or more properties. In one example, the controller 104 may determine the direction of circulation based on the temperature measurements of one or more heat generating components 128. Once the controller 104 determines a direction of circulation, the controller 104 may transmit a signal to a reversing mechanism that, when executed, reverses the direction of circulation.

Figure 12:
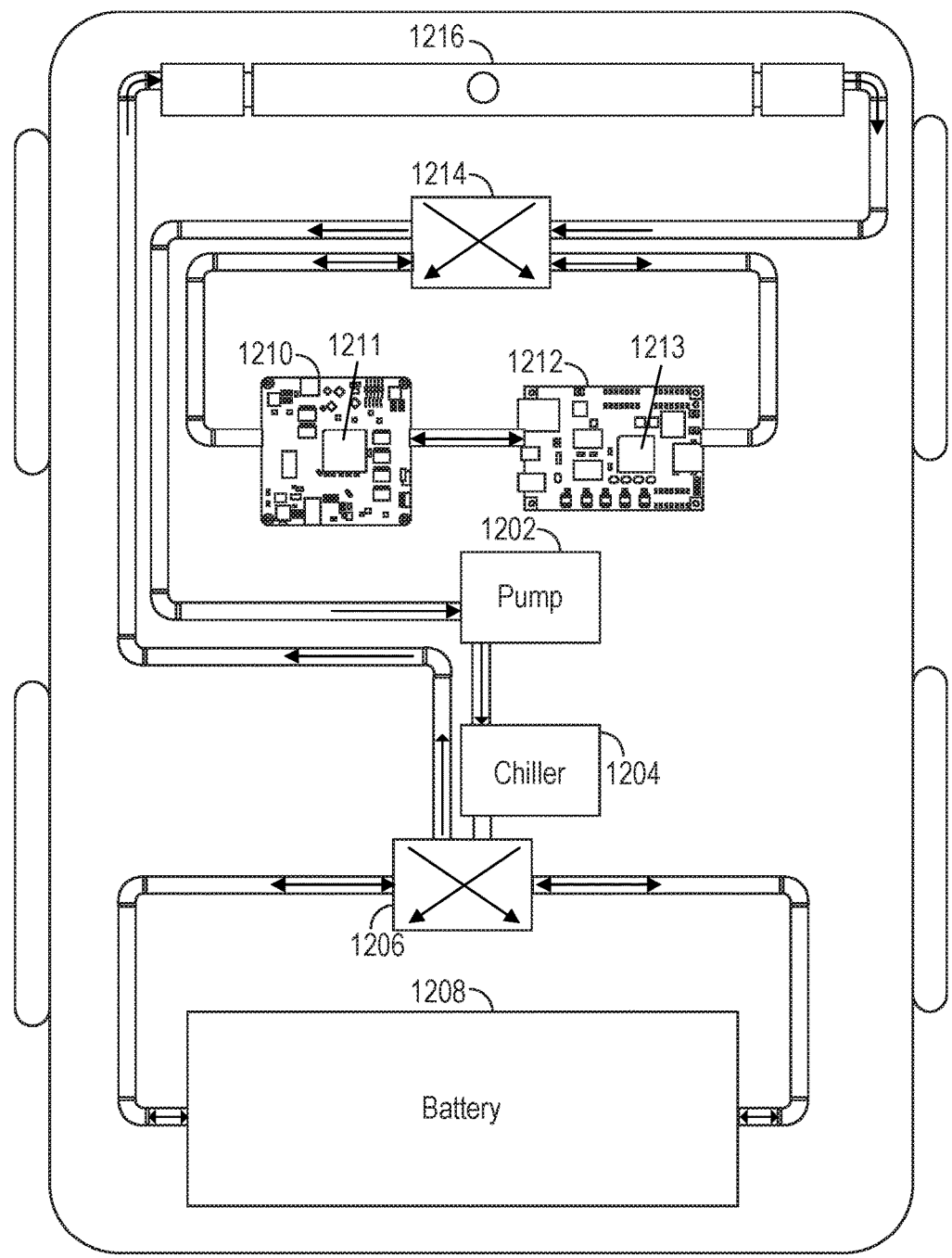
FIG. 12 is an illustration of a reversible cooling system in a vehicle from a top down view.

Referring to FIG. 12, FIG. 12 is an illustration of a cooling system 100 in a vehicle 1200 from a top down view. The cooling system 100 may be used to cool heat generating components in a vehicle 1200 such as various electronic components. In various embodiments, the output of electronic components is unpredictable and varies dependent on a multitude of factors. As a result, the heat generated by the electronic components may vary unpredictably during the operation of the vehicle. The cooling system 100 is configured to react to the unpredictable heat generation of various electronic components by reversing a direction of circulation of all or a portion of a coolant fluid flow path 110. The electronic components may exchange heat with coolant in a reverse order when the direction of circulation is reversed.

The pump 1202 may operate to force coolant throughout the vehicle 1200. As shown in FIG. 12, the pump 1202 forces coolant toward a chiller 1204. The chiller 1204 may be various mechanisms that operate to lower the temperature of coolant that flows through the mechanism. In an exemplary embodiment, the chiller 1204 is a refrigeration mechanism comprising a compressor, expansion valve, and an evaporator. The coolant, that has had its temperature lowered by the chiller 1204 is propelled to an inlet of the first reversing mechanism 1206.

In various embodiments, the first reversing mechanism may comprise a multitude of three-way valves, as shown in FIGS. 6 and 7. Coolant that passes from the chiller 1204 to the first reversing mechanism 1206 may be directed in one of two directions to circulate to the battery 1208. The coolant may cool a side of the battery 1208 that the coolant enters more efficiently than the side of the battery 1208 that the coolant exits. In an exemplary embodiment, the first reversing mechanism 1206 may reverse the direction of circulation periodically so that both sides of the battery 1208 receive the same amount of cooling on average.

As shown in FIG. 12, the coolant may be directed from the battery 1208 back to the first reversing mechanism 1206. The coolant may be propelled from an outlet of the first reversing mechanism 1206 to a radiator 1216 of the vehicle 1200. The coolant, which may be warmed by the battery 1208 may be cooled by the radiator 1216 before being propelled to an inlet of the second reversing mechanism 1214. The second reversing mechanism 1214 may direct the coolant from its inlet in one of two directions to cool a first electronic component 1210 and a second electronic component 1212. The direction of circulation of the second reversing mechanism 1214 may determine the order at which coolant comes into thermal contact with the first electronic component 1210 and the second electronic component 1212. The coolant may be propelled from the first electronic component 1210 and the second electronic component 1212 back to the second reversing mechanism 1214. The coolant may be directed from an outlet of the second reversing mechanism 1214 back to the pump 1202.

The first electronic component 1210 and second electronic component 1212 may comprise electronic processing units that process instructions. The first electronic component 1210 may comprise a first electronic processing unit 1211 and the second electronic component 1212 may comprise a second electronic processing unit 1213. The controller 104 may determine a direction of circulation based on an amount of processing of the electronic processing units. The sensors 130 may measure the amount of processing by the electronic processing units and transmit the amount of processing to the controller 104, whereby the controller 104 determines a direction of circulation. In various embodiments, instructions in the electronic processing units may be queued. The controller 104 may determine a direction of circulation based on the electronic processing unit that has the largest processing load in its queue. The controller 104 may transmit a signal to the second reversing mechanism 1214 to implement a direction of circulation based on the determination.

Figure 13:
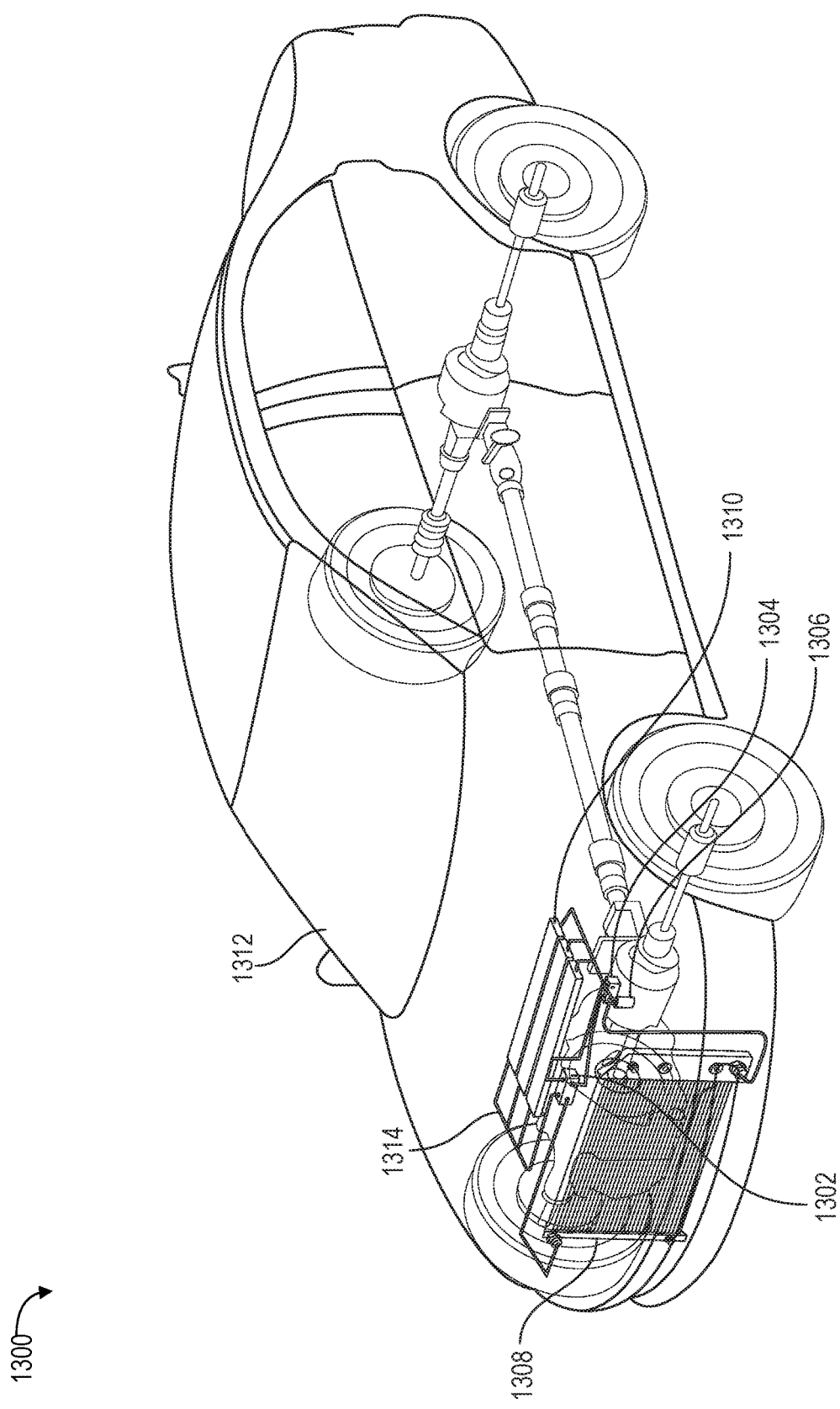
FIG. 13 is an illustration of a reversible cooling system in a vehicle with multiple heat generating batteries.

Referring to FIG. 13, FIG. 13 is an illustration of a cooling system 1300 in a vehicle 1312 with multiple heat generating batteries 1310. The cooling system 1300 may include a reversing mechanism 1302 that is fluidly coupled to coolant that flows in a coolant fluid flow path 1314. The coolant is circulated, by a pump 1304. As shown in FIG. 13, the multiple heat generating batteries 1310 may be connected in parallel to the coolant fluid flow path 1314.

The vehicle 1312 may include one or more components to cool coolant in the coolant fluid flow path 1314. As shown in FIG. 13, the cooling system 1300 includes a chiller 1306 and a radiator 1308. Warm coolant may be cooled by the radiator 1308 and further cooled by the chiller 1306. The coolant is circulated through the radiator 1308 and chiller 1306 to the pump 1304. The pump 1304 directs the coolant to the reversing mechanism 1302.

The reversing mechanism 1302 may direct coolant to the multiple heat generating batteries 1310. As shown in FIG. 13, the multiple heat generating batteries 1310 are connected to the coolant fluid flow path 1314 in parallel. Coolant may be directed from the reversing mechanism 1302 through the multiple heat generating batteries 1310 in a forward direction or a reverse direction depending on a state of the reversing mechanism 1302. In an exemplary embodiment, the multiple heat generating batteries 1310 may incorporate two or more temperature sensors that measure the temperature of portions of the multiple heat generating batteries 1310. The reversing mechanism 1302 may be configured to switch the direction of circulation based on temperature measurements from the sensors. Also, in an exemplary embodiment, the reversing mechanism 1302 may be configured to switch the direction of circulation of coolant periodically.

Figure 14:
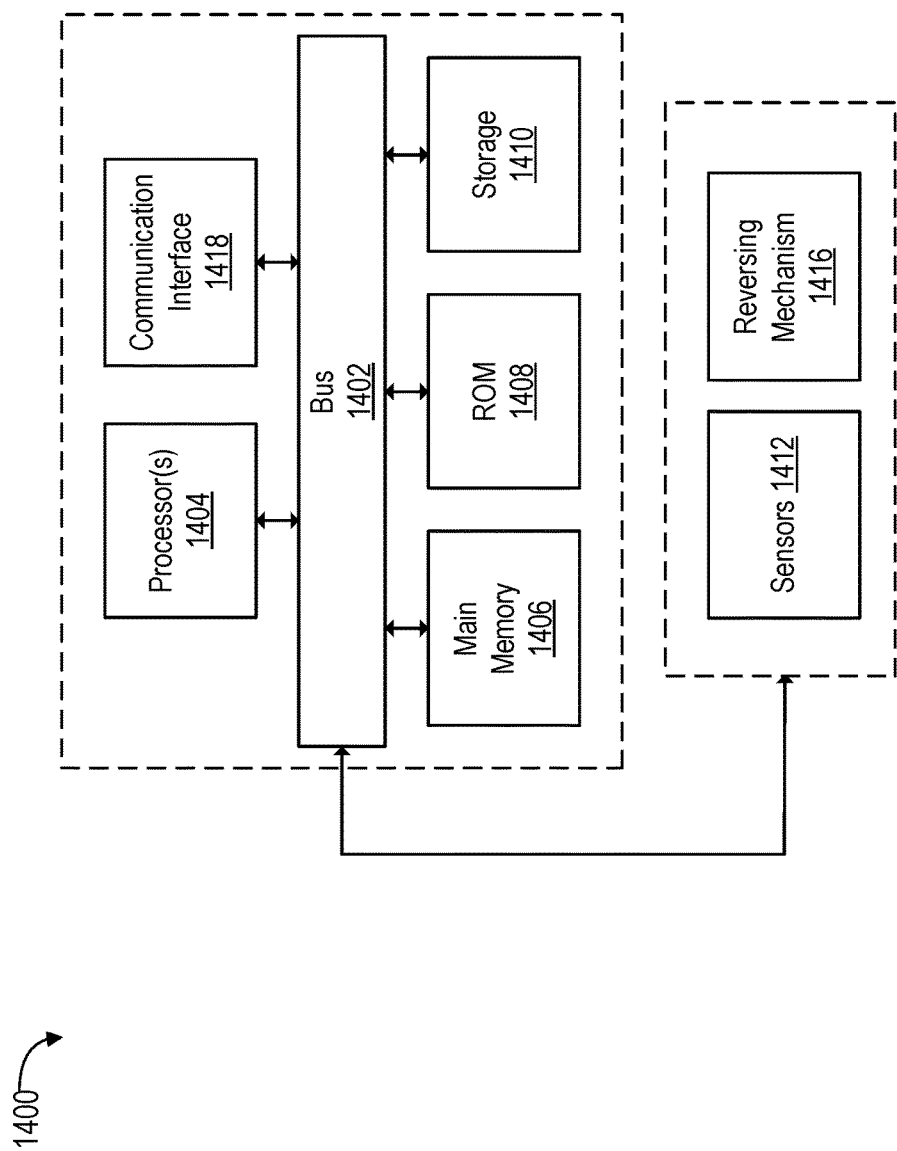
FIG. 14 is a schematic illustrating the computing components that may be used to implement various features of embodiments described in the present disclosure.

FIG. 14 is a block diagram that illustrates a computer system 1400 upon which various embodiments of the controller 104 may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to an output device, such as a cathode ray tube (CRT) or LCD display (or touch screen), for displaying information to a computer user. An input device, including alphanumeric and other keys, is coupled to bus 1402 for communicating information and command selections to processor 1404. Another type of user input device is cursor control, such as a mouse, a trackball, or cursor direction keys for communicating direction information and command selections to processor 1404 and for controlling cursor movement on an output device. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors 1404. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1400 may implement the techniques described herein using customized hard-wired logic, one or more ASICs or FPGAs, firmware and/or program logic which in combination with the computer system 1400 causes or programs the computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a component control. A component control local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

The computer system 1400 may be connect to one or more sensors 1412 through the bus 1402. The one or more sensors 1412 may measure various properties of heat generating components 128, the coolant pump 120, the fluid chiller 126, and the coolant fluid flow path 110. In an exemplary embodiment, the one or more sensors 1412 measure temperatures of the heat generating components 128, coolant pump 120, fluid chiller 126, and coolant in the coolant fluid flow path 110. The measurements of the one or more sensors 1412 may be transmitted through bus 1402 to the main memory 1406. The computer system 1400 may transmit signals through the bus 1402 to the reversing mechanism 1416. The reversing mechanism 1416 is a component of the cooling system 100 that controls the direction of circulation of coolant in the coolant fluid flow path 110. Instructions from the computer system 1400 may be sent to the reversing mechanism 1416 that, when executed, cause the reversing mechanism 1416 to change the direction of circulation. The computer system 1400 may determine a direction of circulation prior to sending the signal to the reversing mechanism 1416 based on measurements that were transmitted from the sensors 1412.

The computer system 1400 also includes a communication interface 1418 coupled to bus 1402. Communication interface 1418 provides a two-way data communication coupling to one or more network links that are connected to one or more local networks. For example, communication interface 1418 may be an integrated services digital network (ISDN) card, cable component control, satellite component control, or a component control to provide a data communication connection to a corresponding type of telephone line. As another example, communication interface 1418 may be a local area network (LAN) card to provide a data communication connection to a compatible LAN (or WAN component to communicate with a WAN). Wireless links may also be implemented. In any such implementation, communication interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution. Each of the processes, methods, and algorithms described in the preceding sections may be embodied in, and fully or partially automated by, code modules executed by one or more computer systems 1400 or computer processors 1404 comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The various operations of example methods described herein may be performed, at least partially, by one or more processors 1404 that are temporarily configured (e.g., by software) or permanently configured to perform the relevant operations. Similarly, the methods described herein may be at least partially processor-implemented, with a particular processor 1404 or processors 1404 being an example of hardware. For example, at least some of the operations of a method may be performed by one or more processors 1404. Moreover, the one or more processors 1404 may also operate to support performance of the relevant operations in a "cloud computing" environment or as a "software as a service" (SaaS). For example, at least some of the operations may be performed by a group of computers (as examples of machines including processors 1404), with these operations being accessible via a network (e.g., the Internet) and via one or more appropriate interfaces (e.g., an Application Program Interface (API)).

The performance of certain of the operations may be distributed among the processors 1404, not only residing within a single machine, but deployed across a number of machines. In some example embodiments, the processors 1404 may be located in a single geographic location (e.g., within a home environment, an office environment, or a server farm). In other example embodiments, the processors 1404 may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system, the system comprising:
a first component in contact with coolant and a second component in contact with the coolant in a vehicle;
a coolant pump configured to circulate the coolant through a coolant flow path, in a direction from the first component to the second component, wherein an initial first temperature of the first component is higher than an initial second temperature of the second component; and
a controller configured to, in response to a temperature of the second component increasing from the initial second temperature to a modified second temperature, the modified second temperature being equal to or greater than the initial first temperature, reverse the direction of circulation of coolant to a reversed direction, wherein the reversed direction is from the second component to the first component.

2. The system of claim 1, further comprising:
one or more sensors that measure one or more properties of the first component and the second component; and
the controller is configured to reverse the direction of circulation based on measurements from the one or more sensors.

3. The system of claim 2 wherein the controller is configured to periodically reverse the direction of circulation.

4. The system of claim 2:
wherein the system further comprises one or more valves in the coolant flow path; and;
wherein the one or more valves are operable to reverse the direction of circulation.

5. The system of claim 2 wherein the controller reverses the direction of the coolant pump.

6. The system of claim 4, further comprising:
a refrigeration mechanism in the coolant flow path that is configured to reduce a temperature of the coolant;
wherein the one or more sensors are configured to measure the temperature of at least one of the first component and of the second component; and
wherein the controller is configured to reverse the direction of circulation based on the temperature measured by the one or more sensors.

7. The system of claim 2:
wherein the first component contains a first electronic processing unit and the second component contains a second electronic processing unit; and
wherein the controller is configured to determine the direction of circulation based on whichever of the first electronic processing unit and the second electronic processing unit has a larger processing load in its respective queue.

\* \* \* \* \*